No. 716,273. Patented Dec. 16, 1902.
C. L. PEIRCE, Jr.
EXPANSIBLE BOLT FASTENING DEVICE.
(Application filed Feb. 10, 1902.)
(No Model.)

UNITED STATES PATENT OFFICE.

CHARLES L. PEIRCE, JR., OF CHICAGO, ILLINOIS.

EXPANSIBLE BOLT-FASTENING DEVICE.

SPECIFICATION forming part of Letters Patent No. 716,273, dated December 16, 1902.

Application filed February 10, 1902. Serial No. 93,378. (No model.)

*To all whom it may concern:*

Be it known that I, CHARLES L. PEIRCE, Jr., a citizen of the United States, and a resident of Chicago, in the county of Cook and State of Illinois, have invented certain new and useful Improvements in Expansible Bolt-Fastening Devices; and I do hereby declare that the following is a full, clear, and exact description thereof.

My invention has reference to the means of securing bolts to masonry; and it consists, essentially, in a peculiar form of bolt whereby in connection with a collar or sleeve of expansible soft metal this is accomplished, all as will be more fully set forth hereinafter in connection with the accompanying drawings and subsequently claimed.

Figure 1:
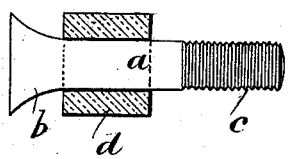
Figure 2:
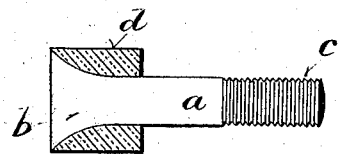
Figure 3:
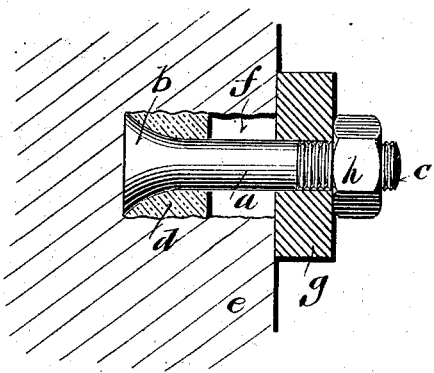

In the said drawings, Figure 1 is a view of my said bolt with the soft-metal collar or sleeve loose thereon. Fig. 2 is a view of said bolt with said collar or sleeve molded or cast inseparably thereon. Fig. 3 is a view illustrating my said bolt secured within a perforation in the masonry by the expansion of the said collar or sleeve and showing also an object held in place on said bolt.

It has been attempted for several years to secure bolts to masonry by making perforations in the latter of larger diameter than the body of the bolt and then to slip hollow soft-metal rings upon the bolt and tamp them against the head of the bolt within the perforation, so as to expand the metal, the said bolt-heads being either square or tapered; but in practice it has been found that on the application of any considerable weight or pressure to the exterior projecting end of the bolt the latter readily becomes loose, the tendency of the expanded metal being to move outwardly, especially when pressure was exerted by screwing a nut on the end of the bolt against an object secured thereon. This difficulty I have overcome by forming the inner end or head of the bolt on the arc of a circle longitudinally, as hereinafter explained.

Referring to the drawings, *a* represents the shank of my improved bolt, *b* the head thereof, and *c* the threaded end, while *d* designates the soft-metal collar or sleeve. In Fig. 1 this latter part is shown loose on the shank of the bolt and in Fig. 2 as being molded or cast about the head *b*, this being immaterial and a matter of convenience or choice in any given instance.

In Fig. 3, *e* represents a section of stone or other material having a hole *f* drilled therein for the reception of the described bolt, the soft-metal collar or sleeve *d* being shown expanded in this figure, which is preferably done by tamping the metal, a tube being slipped over the bolt, the inner end of the tube bearing against the sleeve or collar *d* and the outer end of the tube receiving the necessary blows or impacts. When the bolt is thus firmly secured, the tube is withdrawn and the object (indicated by *g* in Fig. 3) supported on the bolt and a nut *h* run on the latter.

By reason of the described arc shape of the head or inner end *b* of my bolt the soft metal of the collar or sleeve *d* as it is expanded is simultaneously compressed toward a common circular line surrounding the bolt-head, and subsequent pressure or force on the outer end of the bolt tends always to still further expand and compress the molecular particles of the collar or sleeve toward the single circular line instead of outwardly toward the screw-threaded end of the bolt, and thus my bolt will withstand a vastly greater strain or pressure and remain immovably embedded than would be possible without the described peculiar shape of the head.

Having thus described my invention, what I claim as new, and desire to secure by Letters Patent, is—

A bolt having the head thereof formed longitudinally everywhere on the arc of a circle in combination with a soft-metal collar or sleeve.

In testimony that I claim the foregoing I have hereunto set my hand, at Chicago, in the county of Cook and State of Illinois, in the presence of two witnesses.

CHARLES L. PEIRCE, JR.

Witnesses:
OTTO W. KRUEGER,
JAS. J. WALSH.